No. 678,120. Patented July 9, 1901.
M. E. LESSENBERRY.
BALING PRESS.
(Application filed Oct. 16, 1900.)

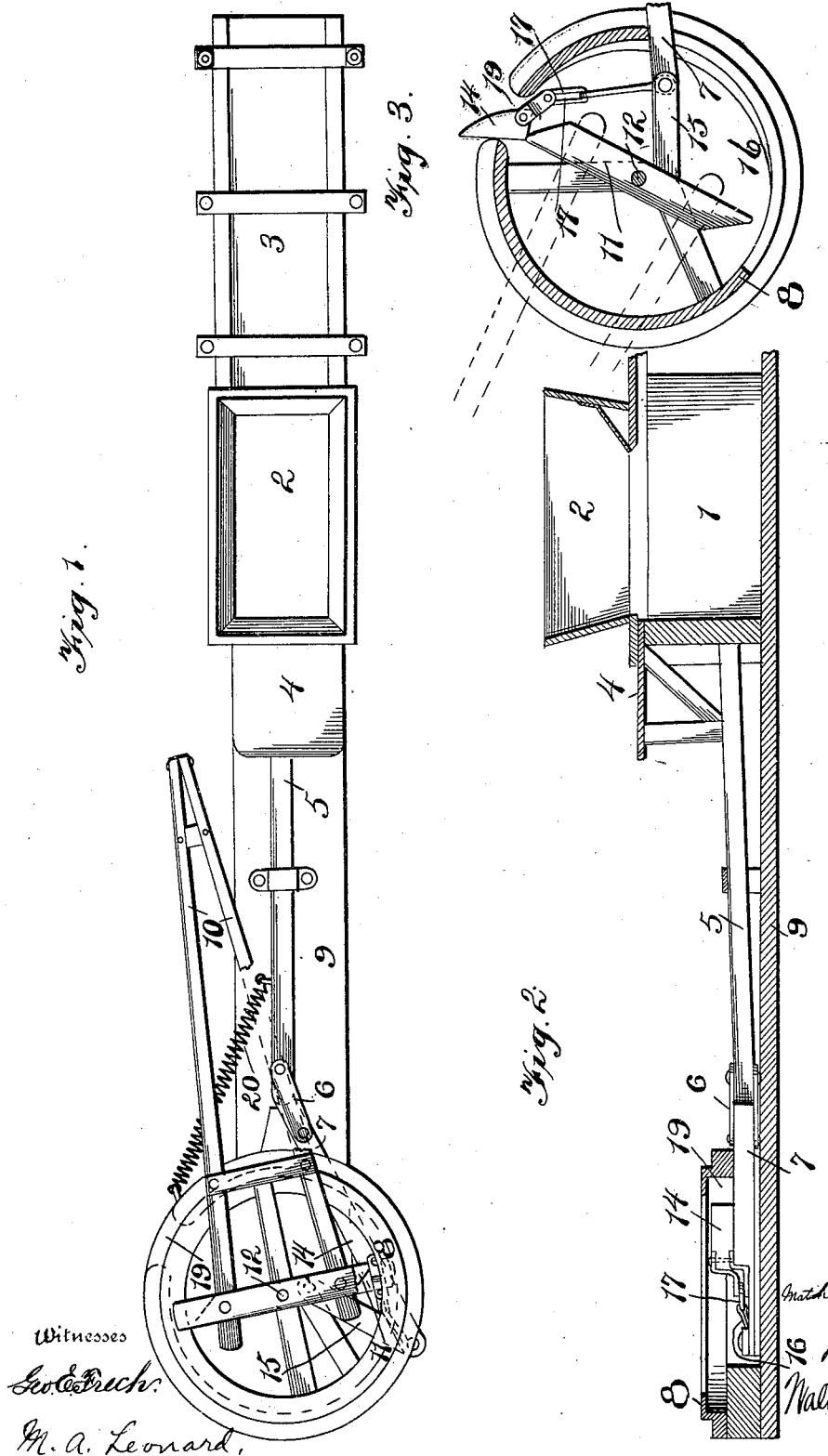

(No Model.) 2 Sheets—Sheet 2.

Witnesses
Geo. E. Frech.
M. A. Leonard.

Inventor
Matthew E. Lessenberry
By Walter R. Hensey
Attorney

UNITED STATES PATENT OFFICE.

MATHEW EDMON LESSENBERRY, OF GIBSON, TENNESSEE.

BALING-PRESS.

SPECIFICATION forming part of Letters Patent No. 678,120, dated July 9, 1901.

Application filed October 16, 1900. Serial No. 33,252. (No model.)

*To all whom it may concern:*

Be it known that I, MATHEW EDMON LESSENBERRY, a citizen of the United States, residing at Gibson, in the county of Gibson, State of Tennessee, have invented certain new and useful Improvements in Baling-Presses; and I do hereby declare the following to be a full, clear, and exact description of the invention, such as will enable others skilled in the art to which it appertains to make and use the same.

My invention has relation to baling-presses; and it consists in the novel construction and arrangement of its parts, as hereinafter described.

The object of my invention is to provide a means for operating the plunger of a baling-press, said means being positive in its action and being so constructed as to utilize a minimum amount of the power for operating the plunger and avoiding as much friction as possible.

The invention resides principally in the plunger-operating means or power end of the press.

Figure 4:
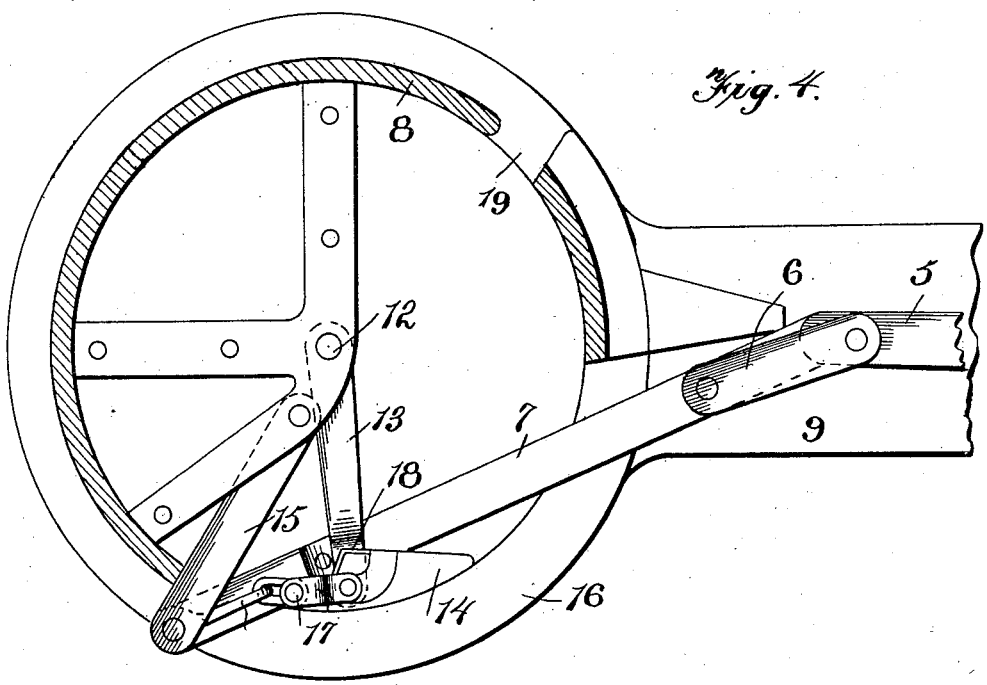
Figure 5:
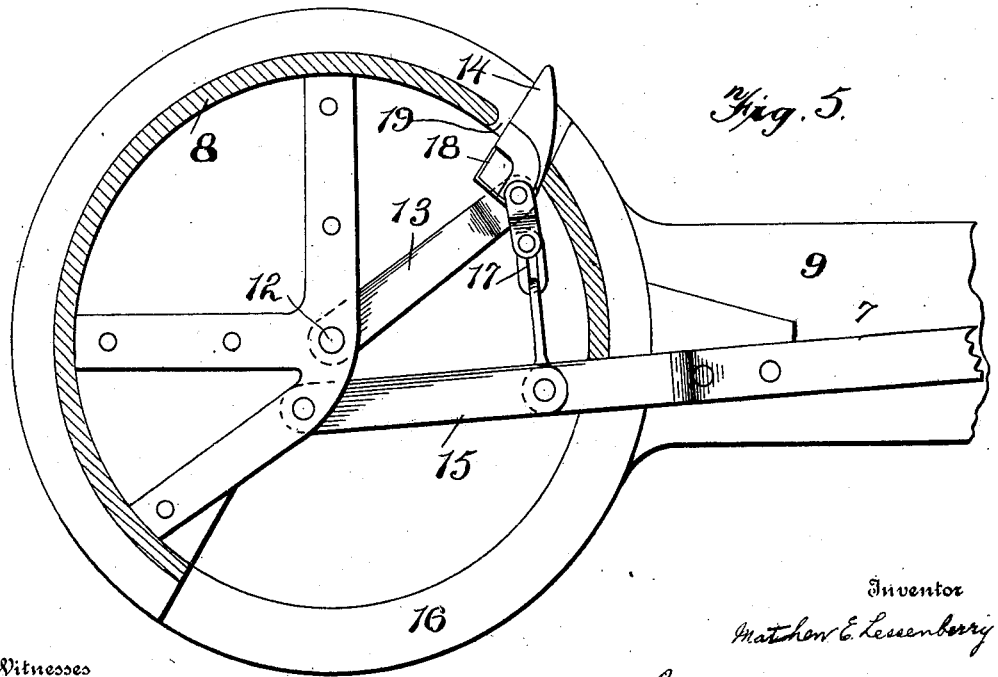

In the accompanying drawings, Figure 1 is a top plan view of the baling-press. Fig. 2 is a longitudinal sectional view of the baling-press with the right-hand end cut off. Fig. 3 is a horizontal sectional view of the power end, showing one position of the parts. Fig. 4 is a horizontal sectional view of the power end, showing another position of the parts. Fig. 5 is a horizontal sectional view of the power end, showing a third position of the parts.

The baling-press consists of the chamber 1, having the hopper 2 located on top thereof, and immediately behind which is located the banding-chamber 3. The plunger 4 is located in the chamber 1 and is adapted to reciprocate therein. The plunger-rod 5 is connected at one end with the rear end of the plunger 4, and at its other end it is connected by means of a link 6 with the bar 7. The drum 8 is fixed to the sill 9 at the extreme end of the latter. The horse-power sweep 10 is provided at its inner end with a cross-beam 11, the ends of which are beveled, as shown in Fig. 3. Said cross-beam is attached at its middle to a pin 13, which in turn is concentrically journaled in the drum 8. The arm 13 is located within the drum 8. The inner end of said arm is concentrically pivoted within the said drum, and to the outer end of said arm is pivotally attached a dog 14. The forward end of said dog is pointed, and its rear end is blunt, as shown in the several figures of the drawings. The arm 15 is also located within the drum 8. The inner end of said arm is pivotally attached to the sill 9, just off the center of the drum. The outer end of the said arm 15 passes through an elongated opening 16 in the side of the drum 8, and to the outer end of the arm 15 the end of the bar 7 is pivotally attached. At the same pivotal point the end of the connecting-arm 15 is attached at one end, and through the link 17 the opposite end of the said arm is connected with the blunt end of the dog 14, the blunt end of the said dog being incased in a suitable metallic plate 18. The side of the drum 8 is also provided in its side with an opening, which toward the end of the stroke of the plunger-rod and plunger is adapted to receive the dog 14 in a manner as hereinafter described.

The operation of the baling-press is as follows: The draft-team is harnessed to the free end of the sweep 10, and the latter is revolved, causing the power-arm 12 to rotate. As the latter is rotated its end comes in contact with the blunt end of the dog 14, as shown in Fig. 1. The said dog is moved around against the inner face of the drum 8. The cross-arm pulls the arm 15 from the position as shown in Fig. 4 into alinement with the bar 7. Thus the said bar 7 is moved forward, which in turn moves the plunger-rod 5 forward, and the plunger is operated. When the end of the dog 14 reaches the opening 19 in the side of the drum 8, the point of the said dog enters the said opening, and the dog is thrown into the position as shown in Figs. 3, and 5, and thus the beveled end of the power-arm 12 is permitted to pass the blunt end of the dog 14 and disengage the same. At this point the spring 20, which is attached at one end to the plunger-rod 5 and at its other end to the drum 8 or the sill 9 contracts, (it previously having been extended by the operation above described,) and the parts are brought back to the positions as shown in Fig. 4.

The operation as above described is repeated every time either end of the power-arm 12 comes in contact with the blunt end of the dog 14.

Having described my invention, what I claim as new, and desire to secure by Letters Patent, is—

1. A baling-press consisting of a baling-chamber and a reciprocating plunger and plunger-rod, a drum connected with said chamber, an arm pivoted in said drum concentrically therewith, a dog pivoted to the said arm, an arm pivoted in said drum eccentrically therewith, a cross-arm connecting said arms together, the rear end of the plunger-rod being connected to the eccentrically-pivoted arm, a power-arm adapted to engage and operate the dog, said drum having openings for the reception of the dog and plunger-rod or its connections and a means for operating the power-arm.

2. A baling-press consisting of a baling-chamber and a reciprocating plunger and plunger-rod, a drum connected with said chamber, an arm pivoted in said drum concentrically therewith, a dog pivoted on said arm, said arm being connected with the plunger-rod, a power-arm adapted to engage and operate said dog, said drum having openings for the reception of the dog and the plunger-rod or its connections and a means for operating the power-arm.

In testimony whereof I affix my signature in presence of two witnesses.

MATHEW EDMON LESSENBERRY.

Witnesses:
ROBERT F. CANNON,
MATIN BURROW.